(12) United States Patent
Bartoccini et al.

(10) Patent No.: US 9,011,960 B2
(45) Date of Patent: Apr. 21, 2015

(54) LOW-FAT WATER-IN-OIL EMULSION CONTAINING SUBSTANTIAL AMOUNTS OF HOH TRIGLYCERIDES

(75) Inventors: Marta Bartoccini, Vlaardingen (NL); Susanna Kimberley van der Hoorn, Vlaardingen (NL); Eckhard Flöter, Berlin (DE)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/995,239

(22) PCT Filed: Nov. 28, 2011

(86) PCT No.: PCT/EP2011/071178
§ 371 (c)(1),
(2), (4) Date: Jun. 18, 2013

(87) PCT Pub. No.: WO2012/084420
PCT Pub. Date: Jun. 28, 2012

(65) Prior Publication Data
US 2013/0266716 A1    Oct. 10, 2013

(30) Foreign Application Priority Data
Dec. 23, 2010    (EP) .................................... 10196797

(51) Int. Cl.
*A23D 7/00*    (2006.01)
*A23D 7/04*    (2006.01)

(52) U.S. Cl.
CPC ...................................... *A23D 7/001* (2013.01)

(58) Field of Classification Search
None
See application file for complete search history.

(56) References Cited

U.S. PATENT DOCUMENTS

| | | | |
|---|---|---|---|
| 6,777,018 B2 * | 8/2004 | Floeter et al. | 426/603 |
| 8,182,857 B2 * | 5/2012 | Cleenewerck et al. | 426/601 |
| 8,304,010 B2 * | 11/2012 | Cleenewerck | 426/607 |
| 8,460,737 B2 * | 6/2013 | Cleenewerck et al. | 426/607 |
| 2009/0123633 A1 * | 5/2009 | Cleenewerck et al. | 426/607 |
| 2013/0052326 A1 * | 2/2013 | Bhaggan et al. | 426/607 |

FOREIGN PATENT DOCUMENTS

| | | |
|---|---|---|
| EP | 0347006 A2 | 12/1989 |
| WO | WO0241698 A1 | 5/2002 |
| WO | WO0241699 A1 | 5/2002 |
| WO | WO03096817 | 11/2003 |
| WO | WO03096817 A1 | 11/2003 |
| WO | WO2010060712 | 6/2010 |
| WO | WO2010060713 A1 | 6/2010 |

OTHER PUBLICATIONS

Elvers et al, Margarines and Shortenings, Ullmanns Encyclopedia of Industrial Chemistry, 1990, 156-158, 5th Edition, vol. A16.
European Search Report for Application No. EP10196797 completed May 31, 2011.
PCT International Search Report and Written Opinion for International Application No. PCT/EP2011/071178 completed Jan. 26, 2012.
Gunstone, Frank D. et al., The Lipid Handbook, Gunstone Edition, Lipid Handbook, Jan. 1, 2007, pp. 59-63, 3rd Edition.
IRPR2 in PCTEP2011071178, Mar. 8, 2013.
Written Opinion 1 in PCTEP2011071178, Feb. 9, 2012, WO.

* cited by examiner

*Primary Examiner* — Carolyn Paden
(74) *Attorney, Agent, or Firm* — Gerard J. McGowan, Jr.

(57) ABSTRACT

The invention relates to water-in-oil emulsion comprising 50 to 85 wt. % of an aqueous phase and 15 to 50 wt. % of a fat phase, wherein said fat phase comprises HOH triglycerides in an amount of 8 to 50% of the total weight of the fat phase, and HHH triglycerides in an amount of 1 to 6% of the total weight of the fat phase, wherein at least 25% of said HHH triglycerides contain at least two different fatty acid residues, where "H" denotes a saturated fatty acid residue with 16 to 24 carbon atoms and "O" an oleic acid residue. The invention further relates to a process for the preparation of an edible water-in-oil emulsion according to the invention. The invention also relates to the use of a HHH triglyceride fat to promote inversion of an oil-in-water-emulsion comprising 15 to 50 wt % of a fat phase, into a water-in-oil emulsion, wherein said fat phase comprises HOH triglycerides.

20 Claims, No Drawings

LOW-FAT WATER-IN-OIL EMULSION CONTAINING SUBSTANTIAL AMOUNTS OF HOH TRIGLYCERIDES

FIELD OF THE INVENTION

The present invention deals with edible low-fat water-in-oil emulsions containing substantial amounts of HOH triglycerides, a process for the preparation of said emulsions, and the use of HHH triglycerides in said emulsions.

BACKGROUND OF THE INVENTION

There are many edible water-in-oil emulsions, amongst which are edible spreads, such as margarines. Water-in-oil emulsions have a continuous fat phase and a dispersed aqueous phase.

The fat phase of margarine and similar edible fat continuous spreads is often a mixture of liquid oil (i.e. fat that is liquid at ambient temperature) and fat which is solid at ambient temperatures. The solid fat, also called structuring fat or hardstock fat, serves to structure the fat phase and helps to stabilize the emulsion. The hardstock fat also plays an important role in imparting structural characteristics such as a semi-solid, plastic or spreadable consistency. For a margarine or spread, ideally the hardstock fat has such properties that it melts or dissolves at mouth temperature. Otherwise the product may have a heavy and/or waxy mouth feel. The hardstock fat forms a network throughout the liquid oil providing structure to the water-in-oil emulsion. Aqueous phase droplets are retained within the spaces of the lattice of solid fat crystals. In this way coalescence of the droplets and separation of the heavier aqueous phase from the fat phase is prevented.

The technology of edible water-in-oil emulsions is well established. Generally, edible water-in-oil emulsions like margarines and similar edible fat continuous spreads are prepared according to processes that encompass the following steps:
1. Mixing of the liquid oil, the structuring fat and the aqueous phase at a temperature at which the structuring fat is definitely liquid;
2. cooling of the mixture under high shear to induce crystallization of the structuring fat and to create a water-in-oil emulsion by inversion;
3. formation of a fat crystal network to stabilize the resulting water-in-oil emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

The type of fat and the ratio of liquid oil and solid fat are chosen such that after proper processing of the fat blend with an aqueous phase a product with a suitable consistency and mouth-feel is obtained.

Vegetable oils are commonly used to prepare margarine fats. The terms 'fat' and 'oil' are used interchangeably in this specification. Where applicable the prefix 'liquid' or 'solid' is added to indicate if the fat or oil is liquid or solid at ambient temperature as understood by the person skilled in the art. Vegetable fats are preferred over animal fats because their unsaturated fat composition enhances the spread's nutritional value. Besides that, vegetable fats are a relatively cheap resource. However, natural, non-processed vegetable fats which have hardstock functionality are rare. Natural fats in the context of this specification are fats which as such are present in their non-genetically modified source organism, particularly in the seeds or fruits of particular plants. For acting as hardstock fat such non-processed vegetable fats usually lack the necessary high content of saturated fatty acids with a chain length of at least 16 carbon atoms. Shea fat, cocoa butter and palm oil are a few examples of fats containing a substantial amount of saturated fatty acid.

Fractionation, hydrogenating and interesterification are well known techniques for turning vegetable oils into suitable hardstock fats. The present trend in food processing, however, is to avoid processing, as much as possible and to opt for natural ingredients and natural processing. Natural processing means that the ingredients have a natural origin and after harvesting have been subjected to no other treatment than a refining and/or purification treatment and to no modification treatment whatsoever.

More natural processing appeals to manufacturers, as it may lower the cost of the production process and the required number of processing steps.

Generally, fats with a high content of HUH triglycerides show good structuring properties. "H" denotes a saturated fatty acid residue containing 16 to 24 carbon atoms, preferably with 16 or 18 carbon atoms, i.e. palmitic acid (C16:0) and stearic acid (C18:0). "U" denotes an unsaturated C18 fatty acid residue, such as oleic acid (C18:1) or linoleic acid (C18:2).

Palm oil, although a relatively cheap resource, needs modification before it is suited for use as hardstock fat. On its own, its structuring functionality is insufficient for the manufacture of good products. The relatively low level of saturated fatty acids (<50 wt. %), their unfavourable distribution over the constituting triglycerides and the relatively high content (>15 wt. %) of polyunsaturated fatty acids make it necessary to subject palm oil to an oil modification treatment. Besides its insufficient structuring ability, palm oil also suffers from the abundant presence of POP and PPO type triglycerides that post-crystallize as undesired fat grains in the final fat spread, where "P" denotes palmitic fatty acid residue and "O" denotes an oleic fatty acid residue.

Cocoa butter, in its unprocessed form, contains a high amount of HUH triglycerides and has been used to structure water-in-oil emulsions, such as margarines. However, use of cocoa butter as hardstock fat for spread preparation entails serious disadvantages. Cocoa butter also suffers, as exampled in its main application, chocolate manufacture, from severe re-crystallisation phenomena, which is known as fat blooming. Similar defects are feared in spread preparation which would easily spoil the product's consistency. Finally, cocoa butter is generally too expensive to serve as hardstock fat in margarine manufacture.

Shea fat, although having a high content of HUH triglycerides, needs to be fractionated before use, because it contains up to 10 wt. % of non-saponifiable matter. The stearin contains 73 wt. % of HUH where nearly all H are stearic acid residues and nearly all U are oleic acid residues. The high costs of fractionation are prohibitive for the commercial use of shea stearin in spread manufacture.

Natural, non-processed hardstock fats with a high content of HUH in which H mainly is a stearic acid residue, are still much sought ingredients for the manufacture of emulsion spreads with a more natural fat phase (i.e. a fat phase comprising a larger part of natural fats).

WO 02/41699 describes Allanblackia fat and Pentadesma fat as vegetable fats which such a beneficial triglyceride composition that they can be used as natural hardstock fat for water-in-oil emulsions. Besides refining, these fats do not need any modification. Allanblackia fat and Pentadesma fat contain a high StOSt triglyceride content: about 65 wt. % of the triglycerides of Allanblackia fat and about 48 wt. % of the triglycerides of Pentadesma fat, where "St" denotes a stearic fatty acid residue.

WO 02/41698 describes an edible W/O emulsion spread which employs Allanblackia and Pentadesma fats as natural hardstock fats. The described composition comprises 70-20 wt. % of an aqueous phase dispersed in 30-80 wt. % of a fat phase which fat phase is a mixture of 50-99 wt. % of a vegetable oil and 1-50 wt. % of a vegetable hardstock fat, characterized in that at least 5 wt. %, preferably at least 50 wt. % of the hardstock fat is either Allanblackia fat or Pentadesma fat or a mixture of both.

WO03/096817 describes how interesterification of natural fats with a relatively high stearic acid residue content with another fat containing a relatively large amount of C12 and C14 fatty acid residues may further improve the structuring properties of such fats.

A recent trend is the development of food products which have a reduced calorie and fat content. As such, low-fat spreads are of interest which may for example function as alternative to higher fat margarines and butters.

The preparation of low fat margarine spreads is well known in the art. Usually, the production process involves the preparation of a water-continuous pre-emulsion which is subsequently made to undergo a phase inversion by means of cooling and working.

A low fat margarine spread comprising a hardstock fat with a large amount HUH, in particular StOSt triglycerides, combines the benefits of both low fat margarines and said triglycerides. Therefore such a spread is highly desirable. However, we have found that upon processing low fat margarine formulations with a large amount of HUH triglycerides, the phase inversion step is often unstable, and leads for instance to loss of the inversion or to water-in-oil emulsions that break upon spreading.

SUMMARY OF THE INVENTION

We have found a way to provide stable, low fat water-in-oil emulsions, like e.g. margarine spreads, comprising a hardstock fat with a large amount of HUH triglycerides and furthermore to provide a process to prepare such a spread, said process comprising a phase inversion step. More specifically, we have found that providing a hardstock fat comprising both a large amount of HUH triglycerides and an amount of saturated HHH triglycerides, a substantial amount of which is constituted by triglycerides with at least two different fatty acid residues, enables the preparation of stable low fat water-in-oil emulsions, like e.g. margarine spreads.

Accordingly, in a first aspect the invention provides for a water-in-oil emulsion comprising 50 to 85 wt. % of an aqueous phase and 15 to 50 wt. % of a fat phase, wherein said fat phase comprises:
  HOH triglycerides in an amount of 8 to 50% of the total weight of the fat phase, and
  HHH triglycerides in an amount of 1 to 6% of the total weight of the fat phase.

Another aspect of the invention concerns a process for the preparation of an edible water-in-oil emulsion spread according to the invention comprising the steps of:

a. mixing a fat blend comprising
   between 1 and 6 wt. % of HHH triglycerides and
   between 8 and 50 wt. % of HOH triglycerides;
b. providing an aqueous phase;
c. pre-emulsifying said fat blend and said aqueous phase into an oil-in-water emulsion;
d. inverting the formed pre-emulsion into a water-in-oil emulsion.

A further aspect of the invention concerns the use of a HHH triglyceride fat to promote inversion of an oil-in-water-emulsion comprising 15 to 50 wt % of a fat phase, into a water-in-oil emulsion, wherein said fat phase comprises HOH triglycerides, and wherein "H" denotes a saturated fatty acid residue with a C16-C24 carbon chain and "O" denotes an oleic acid residue.

DETAILED DESCRIPTION OF THE INVENTION

Wt % is calculated on total weight of product unless specified otherwise. For the purpose of the invention ambient temperature is defined as a temperature of about 20 degrees Celsius. The terms 'oil' and 'fat' are used interchangeably unless specified otherwise and concern edible oils and fats. Where applicable the prefix 'liquid' or 'solid' is added to indicate if the fat or oil is liquid or solid at ambient temperature as understood by the person skilled in the art. The term 'hardstock' refers to a fat that is solid at ambient temperature.

The present invention relates to a water-in-oil emulsion, preferably to an edible water-in-oil emulsion and more preferable to an edible water-in-oil emulsion which is a spread.

The present invention relates to a water-in-oil emulsion comprising 50 to 85 wt. % of an aqueous phase and 15 to 50 wt. % of a fat phase, wherein said fat phase comprises:
  HOH triglycerides in an amount of 8 to 50% of the total weight of the fat phase, and
  HHH triglycerides in an amount of 1 to 6% of the total weight of the fat phase,
wherein at least 25% of said HHH triglycerides contain at least two different fatty acid residues, where "H" denotes a saturated fatty acid residue with 16 to 24 carbon atoms and "O" an oleic acid residue.

The emulsion has a relatively low fat content, i.e. less than 50 wt. %, which is usually called a low fat emulsion. The fat phase comprises 8 to 50 wt. % of HOH triglycerides as can typically be found in for example Allanblackia fat and pentadesma fat. The usual way to make such low fat water-in-oil emulsions comprises an 'inversion step' in which an oil in water pre-emulsion is inverted into a water-in-oil emulsion. We have found that the inversion of the oil in water pre-emulsion is sometimes difficult or that no stable product can be obtained using these low fat compositions. This is especially so for very low fat compositions. We have found that the inclusion of 1 to 6 wt. % of HHH triglycerides wherein at least 25% of said HHH triglycerides contain at least two different fatty acid residues (i.e. per triglyceride molecule) allows for low fat water-in-oil emulsions to be made with a fat phases comprising HOH triglycerides in an amount of 8 to 50% of the total weight of the fat phase.

Lower fat food products are sometimes preferred by consumers. The present invention is especially suitable for low fat water-in-oil emulsions. Therefore, the amount of fat phase in the water-in-oil emulsion is preferably 20 to 45 wt. % and more preferably 24 to 40 wt. % of said fat phase.

The fat phase preferably comprises HOH triglycerides in an amount of 10 to 40%, and more preferably 12 to 30%, of the total weight of the fat phase.

Fat phases comprising a relatively high amount of POP triglycerides may suffer from the development of undesired fat grains detrimental to for example the structure or organoleptic characteristics of the resulting spread. This is also known as 'POP graininess'. Therefore, preferably at least 25 wt. %, more preferably at least 35 wt. %, even more preferably at least 50 wt. % and still even more preferably essentially all of said HOH triglycerides are StOSt triglycerides.

The water-in-oil emulsion of our invention preferably comprises a fat phase which contains fat derived from Allanblackia fat, Pentadesma fat, Kokum fat, Sal fat or any combinations of these fats. These natural fats have a relatively high content of StOSt triglycerides. Allanblackia fat is denoted with a variety of indigenous names including Sonkyi fat. It is harvested from the African plant Allanblackia of which several species such as *A. floribunda* and *A. stuhlmannii* are known. Allanblackia belongs to the subfamily Clusioideae, which is part of the family Quttiferae. All species share a substantially common fatty acids pattern and triglyceride composition. Pentadesma fat is also obtained from an African plant, the tree *Pentadesma butyracea*. These natural fats have a high stearic acid residues content (for example it may exceed 35 wt. %) an low content of polyunsaturated fatty acid residues (for example it may be lower than <5 wt. %), which makes them suitable to contribute to the hardstock fat of said emulsion. Furthermore, Allanblackia fat and Pentadesma fat contain a high StOSt content: about 65 wt. % of the triglycerides of Allanblackia fat and about 48 wt. % of the triglycerides of Pentadesma fat is StOSt. Preferably a natural fat is selected which contains at least 40 wt. %, more preferably at least 50 wt. % of stearic acid residues. In a more preferred embodiment, the fat phase of said emulsion contains at least 3 wt. %, more preferably at least 5 wt. % and even more preferably at least 8 wt. %, fats derived from Allanblackia fat, Pentadesma fat, Kokum fat, Sal fat or any combination of these fats.

In the water-in-oil emulsion of our invention, the fat phase contains HHH triglycerides in an amount of 1 to 6%, preferably 1.25 to 5% and more preferably 1.5 to 4%, of the total weight of the fat phase, wherein at least 25% of said HHH triglycerides contain at least two different fatty acid residues. Preferably, at least 30 wt. %, more preferably 40 wt. % and even more preferably at least 50 wt. % of said HHH triglycerides contain at least two different fatty acid residues, for example, StStP, PPSt or StPSt.

Preferably the profile of the saturated fatty acid residues of the HHH triglycerides differs, at least 5 wt. % in palmitic acid content and/or at least 5 wt. % in stearic acid content with the profile of the saturated fatty acid residues of the HOH triglycerides. The fatty acid residue profile is defined as the wt. % of the type of saturated fatty acid residue (e.g. P or St) with respect to the total amount of saturated fatty acid residues in either HHH or HOH triglycerides. For example, if the HOH triglyceride consists of 100% POSt, the profile of the HOH contains 47.4 wt. % P and 52.6 wt. % St. If the HHH triglyceride consists of 100% StPSt, the profile of the HHH contains 68.9 wt. % St and 31.1 wt. % P. Thus, the profile of the HOH and HHH triglycerides differ by 16.3 wt. % in stearic acid content and 16.3 wt. % in palmitic acid content.

More preferably the profile of the saturated fatty acid residues of the HHH triglycerides differs at least 8 wt. % in palmitic acid content, and/or at least 8 wt. % in stearic acid content with the profile of the saturated fatty acid residues of the HOH triglycerides.

Natural fats which contain high amounts of HHH triglycerides with at least two different fatty acid residues are rare. Therefore, the water-in-oil emulsion of our invention preferably comprises a fat phase which contains at least 1 wt. %, more preferably 2 wt. % and even more preferably 3 wt. % of an interesterified fat.

Interesterification can be achieved by either chemical or enzymatic means. Chemical interesterification usually results in full randomization. On the other hand, enzymatic interesterification usually is more selective and results in less randomization.

Chemical and enzymatic esterification techniques are well known. Preferably the interesterification is carried out by chemical means.

The water-in-oil emulsion of our invention comprises a fat phase which contains liquid oil and hardstock fat. The hardstock fat forms a network throughout the liquid oil providing structure to the water-in-oil emulsion. Aqueous phase droplets are retained within the spaces of the lattice of solid fat crystals. In this way coalescence of the droplets and separation of the heavier aqueous phase from the fat phase is prevented. In general, the formation of fat crystals which are beta-polymorph are to be avoided in fat continuous food products as these can impart a coarse or gritty mouth feel. Surprisingly, we have found that in the low-fat water-in-oil emulsions according to the invention a relatively high amount of the beta-polymorph exists without seriously affecting the organoleptic characteristics. Therefore, the water-in-oil emulsion of our invention comprises a fat phase which contains a hardstock fat wherein preferably at least 30%, more preferably at least 40% and most preferably at least 50% of the fat crystals are beta-polymorph.

Trans unsaturated fatty acids are known to have a good structuring capacity but are not preferred as they are associated with cardiovascular disease. Therefore, preferably the fat phase comprises less than 5 wt %, more preferably less than 3 wt % and even more preferably less than 1 wt % trans unsaturated fatty acid. Trans unsaturated fatty acids are naturally present mainly in fats of animal origin like for example butter fat and butter oil. Partial hydrogenation of liquid vegetable oils may also lead to the presence of trans unsaturated fatty acids. Therefore, the fat blend preferably does not contain partially hydrogenated fats.

To maintain a healthy composition the fat phase preferably comprises less than 30 wt % saturated fatty acids and preferably less than 25 wt %, like for example 20 to 35 wt %, 25 to 35 wt % or 25 to 30 wt %. Preferably the fat phase comprises at least 40 wt % of poly unsaturated fatty acids.

The liquid oil may be a single oil or a mixture of two or more oils. Likewise the structuring fat may be a single fat or a mixture of two or more fats. The liquid oil and structuring fat may be of vegetable, dairy (e.g. dairy fat or butter oil) or marine (e.g. algae oil or fish oil) origin.

Preferably at least 50 wt % of the liquid oil (based on total amount of liquid oil) is of vegetable origin, more preferably at least 60 wt %, even more preferably at least 70 wt %, still more preferably at least 80 wt %, even still more preferably at least 90 wt % and even still more further preferably at least 95 wt %. Most preferably the oil essentially consists of oil of vegetable origin.

Preferably the liquid oil is selected from soybean oil, sunflower oil, rape seed (canola) oil, cotton seed oil, peanut oil, rice bran oil, safflower oil, palm olein, linseed oil, fish oil, high omega-3 oil derived from algae, corn oil (maize oil), sesame oil, palm kernel oil, coconut oil and combinations thereof. More preferably the liquid oil is selected from soybean oil, sunflower oil, rape seed oil, linseed oil, palm olein and combinations thereof.

Preferably at least 50 wt % of the structuring fat (based on total amount of structuring fat) is of vegetable origin, more preferably at least 60 wt %, even more preferably at least 70 wt %, still more preferably at least 80 wt %, even still more preferably at least 90 wt % and even still more further preferably at least 95 wt %. Most preferably the structuring fat essentially consists of fat of vegetable origin.

Preferably at least 50 wt % of the combined amount of liquid oil and structuring fat total fat blend is of vegetable origin, more preferably at least 60 wt %, even more preferably at least 70 wt %, still more preferably at least 80 wt %, even still more preferably at least 90 wt % and even still more further preferably at least 95 wt %. Most preferably the combined amount of liquid oil and structuring fat essentially consists of fat of vegetable origin.

The aqueous phase may contain the usual spread ingredients such as water, one or more emulsifiers, gelling and/or thickening agents, salt, colouring agent, flavour, a preservation agent and dairy proteins. The aqueous phase may also contain a dispersed fat phase so that eventually an O/W/O-emulsion would result which is a subspecies of the spreads according to the present invention.

The invention also relates to a process for the preparation of an edible water-in-oil emulsion according the present invention comprising the steps of:
a. mixing a fat blend comprising
   between 1 and 6 wt. % of HHH triglycerides and
   between 8 and 50 wt. % of HOH triglycerides;
b. providing an aqueous phase;
c. pre-emulsifying said fat blend and said aqueous phase into an oil-in-water emulsion;
d. inverting the formed pre-emulsion into a water-in-oil emulsion.

The presence of HHH promotes the inversion of the oil-in-water pre-emulsion into the water-in-oil emulsion of the invention.

The process of the invention may suitably be performed with the use of a Votator device. Preferably the process of the present invention is performed with a Votator device, preferably comprising at least one A-unit and at least one C-unit. A suitable Votator sequence is AAAC.

Therefore, the invention also relates to the use of a HHH triglyceride fat to promote inversion of an oil-in-water-emulsion comprising 15 to 50 wt % of a fat phase, into a water-in-oil emulsion, wherein said fat phase comprises HOH triglycerides, and wherein "H" denotes a saturated fatty acid residue with a C16-C24 carbon chain and "O" denotes an oleic acid residue. Preferably the fat phase comprises at least 8 wt. % HOH triglycerides like for example 8 to 50 wt. %, 10 to 40 wt. % and 12 to 30 wt. %.

Preferably, said HHH triglycerides comprise at least 30 wt % of triglycerides containing at least two different fatty acid residues per triglyceride molecule.

Preferably, the use of a HHH triglyceride fat to promote inversion of an oil-in-water-emulsion comprising 15 to 50 wt % of a fat phase, wherein said fat phase comprises Allanblackia fat, Pentadesma fat, Kokum fat, Sal fat or a combination thereof.

The invention is now illustrated by the following non-limiting examples.

EXAMPLES

Allanblackia Fat
Fat from *Allanblackia floribunda* was purified under standard refining conditions.
Stability of Emulsion
The stability of the emulsion inversion process and of the resulting water-in-oil emulsions is analysed by visual inspection of the product as is and upon spreading. A water-in-oil emulsion is classified as instable when free water is present or if, upon spreading, the product breaks up or releases water.
Spreadability
Spreadability is determined according to the following protocol.

A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Example 1 and Comparative Example C1

Pre-emulsions of example 1 and comparative example C1, each containing 25 wt. % of total fat, were formulated as shown in Table 1.

TABLE 1

Composition of example 1 and comparative example C1 (wt. % on total product)

| | Example | |
|---|---|---|
| | 1 | C1 |
| FAT PHASE | | |
| Rapeseed oil | 0.50 | 0.437 |
| Sunflower oil | 18.937 | 16.50 |
| interesterified mixture of 40% shea stearin and 60% multi fractionated palm oil stearin (Iodine Value 14) | 1.375 | — |
| *Allanblackia* fat | 3.625 | 7.50 |
| Lecithin | 0.050 | 0.050 |
| mono- and diglycerides of unsaturated fatty acids | 0.350 | 0.350 |
| Colorant | 0.037 | 0.037 |
| Vitamins | 0.020 | 0.020 |
| Flavour | 0.006 | 0.006 |
| polyglycerol polyricinoleate | 0.10 | 0.10 |
| AQUEOUS PHASE | | |
| water | Balance | Balance |
| Gelatin | 2.0 | 2.0 |
| Starch | 4.0 | 4.0 |
| Potassium sorbate | 0.130 | 0.130 |
| Lactic Acid | 0.10 | 0.10 |

The amount of HHH and HOH triglycerides, the HOH profile and the HHH profile (all calculated on total fat phase) as well as the saturated fatty acid content (SAFA) of the HHH and HOH triglycerides (calculated on the total amount of SAFA contained in the respective triglyceride) of example 1 and comparative example C1 are shown in Table 2.

TABLE 2

Triglyceride profile of example 1 and comparative example C1 (wt. %).

| | Example | |
|---|---|---|
| | C1 | 1 |
| Amount of HHH and HOH: | | |
| HHH | 0.09 | 2.58 |
| HOH | 20.24 | 11.36 |

TABLE 2-continued

Triglyceride profile of example 1 and comparative example C1 (wt. %).

| | Example | |
|---|---|---|
| | C1 | 1 |
| HOH profile: | | |
| POP | 0 | 0.66 |
| StOSt | 19.05 | 9.37 |
| POSt | 1.19 | 1.33 |
| HHH profile: | | |
| H3 mixed | 0 | 1.77 |
| PPP | 0 | 0.64 |
| StStSt | 0 | 0.13 |
| SAFA in HHH: | | |
| St | 98 | 25 |
| P | 2 | 75 |
| SAFA in HOH: | | |
| St | 97 | 88 |
| P | 3 | 12 |

The ingredients of the aqueous phase were added to a premix tank and heated to approx 60° C. The fat phase components were melted at 60° C. and subsequently added to the premix tank. The aqueous phase and fat phase were mixed by stirring to provide an oil-in-water pre-emulsion.

The pre-emulsion was processed using standard inversion processing in a Votator equipped with an AAAC sequence with the C-unit having a volume of 3 litre. The operating parameters are shown in table 3. The overall flow rate is specified in kg/hour (Flow), the temperature (T) in degrees Celsius and the rotational speed in revolutions per minute (rpm) for each unit.

TABLE 3 votator settings for example 1 and comparative example C1.

| | | A1 | | A2 | | A3 | | C |
|---|---|---|---|---|---|---|---|---|
| Example | Flow | rpm | T | rpm | T | rpm | T | rpm |
| 1 | 160 | 1000 | 20 | 1000 | 11 | 1000 | 6 | 1800 |
| C1 | 140 | 1000 | 18 | 1000 | 11 | 1000 | 6 | 1600 |

The formulation of comparative example C1 comprises 25 wt % of fat phase (with respect to the total formulation) containing a source of HOH triglycerides, but no HHH-mixed triglycerides. Processing of the formulation of comparative example C1 did not yield stable water-in-oil emulsions. Rather, either undesired oil-in-water emulsions were obtained, or water-in-oil-emulsions in which free water is visible and which break up after one day, releasing water.

In contrast, processing of the formulation of example 1, which comprises 25 wt % of fat phase (with respect to the total formulation) containing both HOH triglycerides and HHH-mixed triglycerides, yielded a stable, plastic water-in-oil emulsion. No free water was observed. The plastic emulsion was spreadable without breaking up, score 2.

Examples 2, 3, 4 and Comparative Example C2

Pre-emulsions of examples C2, 2, 3 and 4, each containing 38 wt. % of total fat, were formulated as shown in Table 4.

TABLE 4

Composition of examples 2 to 4 and comparative example C2 (wt. % on total product)

| | Example | | | |
|---|---|---|---|---|
| | 2 | 3 | 4 | C2 |
| FAT PHASE | | | | |
| Rapeseed oil | 26.416 | 22.806 | 25.466 | 26.226 |
| Dry fractionated palm oil mid-fraction | — | 13.30 | 7.60 | — |
| *Allanblackia* fat | 9.880 | — | 3.230 | 11.40 |
| interesterified mixture of 40% shea stearin and 60% multi fractionated palm oil stearin (Iodine Value 14) | 1.330 | 1.520 | 1.330 | — |
| mono- and diglycerides of fatty acids | 0.20 | 0.20 | 0.20 | 0.20 |
| Lecithin | 0.150 | 0.150 | 0.150 | 0.150 |
| Colorant | 0.019 | 0.019 | 0.019 | 0.019 |
| Vitamins | 0.019 | 0.019 | 0.019 | 0.019 |
| Flavour | 0.0033 | 0.0033 | 0.0033 | 0.0033 |
| AQUEOUS PHASE | | | | |
| water | Balance | Balance | Balance | Balance |
| Starch | 3.250 | 3.250 | 3.250 | 3.250 |
| Whey powder | 0.400 | 0.40 | 0.40 | 0.40 |
| Salt | 0.250 | 0.250 | 0.250 | 0.250 |
| Potassium sorbate | 0.10 | 0.10 | 0.10 | 0.10 |

The amount of HHH and HOH triglycerides, the HOH profile and the HHH profile (all calculated on total fat phase) as well as the saturated fatty acid content (SAFA) of the HHH and HOH triglycerides (calculated on the total amount of SAFA contained in the respective triglyceride) of examples 2 to 4 and comparative example C2 are shown in Table 5.

TABLE 5

Triglyceride profile of examples 2 to 4 and comparative example C2 (wt. %).

| | Example | | | |
|---|---|---|---|---|
| | C2 | 2 | 3 | 4 |
| Amount of HHH and HOH: | | | | |
| HHH | 0.09 | 1.69 | 2.17 | 1.96 |
| HOH | 20.24 | 18.51 | 24.03 | 19.9 |
| HOH profile: | | | | |
| POP | 0 | 0.42 | 19.46 | 11.3 |
| StOSt | 19.05 | 16.62 | 0.67 | 5.82 |
| POSt | 1.19 | 1.47 | 3.9 | 2.77 |
| HHH profile: | | | | |
| H3 mixed | 0 | 1.12 | 1.3 | 1.22 |
| PPP | 0 | 0.41 | 1.07 | 0.79 |
| StStSt | 0 | 0.08 | 0.08 | 0.08 |
| SAFA in HHH | | | | |
| St | 98 | 25 | 20 | 22 |
| P | 2 | 75 | 80 | 78 |
| SAFA in HOH | | | | |
| St | 97 | 93.5 | 11 | 36 |
| P | 3 | 6.5 | 89 | 64 |

The ingredients of the aqueous phase were added to premix tank and heated to approx 60° C. The fat phase components were melted at 60° C. and subsequently added to the premix tank. The aqueous phase and fat phase were mixed by stirring.

The pre-emulsion were processed using standard inversion processing in a Votator. The emulsion passed through 3 A units and one C unit of the type 3 L or 1.5 L (with a volume of 3 or 1.5 liters), in sequence.

The pre-emulsion were processed using standard inversion processing in a Votator equipped with an AAAC sequence. The operating parameters are shown in table 6. The overall flow rate is specified in kg/hour (Flow), the temperature (T) in degrees Celsius and the rotational speed in revolutions per minute (rpm) for each unit.

Example 4 was processed either with the parameters as set out under 4A or with the parameters as set out under 4B.

TABLE 6 votator settings for examples 2 to 4 and comparative example C2.

| Example | Flow | A1 rpm | A1 T | A2 rpm | A2 T | A3 rpm | A3 T | C Volume | C rpm |
|---|---|---|---|---|---|---|---|---|---|
| C2 | 130 | 1000 | 18 | 1000 | 12 | 1000 | 10 | 1.5 L | 1600 |
| 2 | 130 | 1000 | 18 | 1000 | 12 | 1000 | 10 | 1.5 L | 1600 |
| 3 | 140 | 1000 | 18 | 1000 | 10 | 1000 | 7 | 3 L | 1400 |
| 4A | 140 | 1000 | 18 | 1000 | 10 | 1000 | 7 | 3 L | 800 |
| 4B | 140 | 1000 | 18 | 1000 | 10 | 1000 | 7 | 3 L | 1400 |

The formulation of comparative example C2 comprises 38 wt % of fat phase (with respect to the total formulation) containing a source of HOH triglycerides, but no HHH-mixed triglycerides. Processing of the formulation of comparative example C2 did not yield stable water-in-oil emulsions. Rather, either undesired oil-in-water emulsions were obtained, or water-in-oil-emulsions in which free water is visible, and which break upon testing the spreadability.

In contrast, processing of the formulation of example 2, which comprises 38 wt % of fat phase (with respect to the total formulation) containing both HOH triglycerides and HHH-mixed triglycerides, yielded a stable, plastic water-in-oil emulsion. No free water was observed. The plastic emulsion was smoothly spreadable without breaking up, score 1.

Similarly, processing of the formulation of example 3 yielded a stable product without free water with a spreadability score of 2.

Processing of the formulation of Examples 4A and 4B yielded a stable, plastic water-in-oil emulsion. No free water was observed. The plastic emulsion was smoothly spreadable without breaking up, score 2.

The invention claimed is:

1. Water-in-oil emulsion comprising 50 to 85 wt. % of an aqueous phase and 15 to 50 wt. % of a fat phase, wherein said fat phase comprises:
   HOH triglycerides in an amount of 8 to 50% of the total weight of the fat phase, and
   HHH triglycerides in an amount of 1 to 6% of the total weight of the fat phase, wherein at least 25% of said HHH triglycerides contain at least two different fatty acid residues, where "H" denotes a saturated fatty acid residue with 16 to 24 carbon atoms and "O" an oleic acid residue, wherein at least 25 wt. % of said HOH triglycerides are StOSt triglycerides, where "St" denotes a stearic acid residue.

2. Water-in-oil emulsion according to claim 1, comprising 20 to 45 wt. %, of said fat phase.

3. Water-in-oil emulsion according to claim 1, wherein said fat phase comprises HOH triglycerides in an amount of 10 to 40% of the total weight of the fat phase.

4. Water-in-oil emulsion according to claim 1, wherein said fat phase comprises HHH triglycerides in an amount of 1.25 to 5% of the total weight of the fat phase.

5. Water-in-oil emulsion according to claim 1, wherein at least 30 wt. % of said HHH triglycerides contain at least two different fatty acid residues.

6. The water-in-oil emulsion according to claim 5 wherein at least 50 wt % of the HHH triglycerides contain at least 2 different fatty acid residues.

7. Water-in-oil emulsion according to claim 1, wherein the profile of the saturated fatty acid residues of the HHH triglycerides differs,
   at least 5 wt. % in palmnitic acid content, and/or
   at least 5 wt. % in stearic acid content
with the profile of the saturated fatty acid residues of the HOH triglycerides.

8. Water-in-oil emulsion according to claim 1, wherein at least 35 wt. % of said HOH triglycerides are StOSt triglycerides, where "St" denotes a stearic acid residue.

9. The water-in-oil emulsion according to claim 8 wherein at least 50 wt % of the HOH triglycerides are StOSt triglycerides where "St" denotes a stearic acid residue.

10. Water-in-oil emulsion according to claim 1, wherein the fat phase contains fat derived from Allanblackia fat, Pentadesma fat, Kokum fat, Sal fat or any combination of these fats.

11. Water-in-oil emulsion according to claim 1, wherein the fat phase contains at least 3 wt. % fats derived from Allanblackia fat, Pentadesma fat, Kokum fat, Sal fat or any combination of these fats.

12. The water-in-oil emulsion according to claim 11 wherein the fat phase contains at least 8 wt % fats derived from Allanblackia fat, Pentadesma fat, Kokum fat, Sal fat or any combination of these fats.

13. Water-in-oil emulsion according to claim 1, wherein the fat phase contains at least 1 wt. % interesterified fat.

14. The water-in-oil emulsion according to claim 13 wherein the fat phase contains at least 3 wt % interesterified fat.

15. Water-in-oil emulsion according to claim 1, wherein at least 30 % of the at crystals are beta-polymorph.

16. The water-in-oil emulsion according to claim 15 wherein at least 40% of the fat crystals are beta-polymorph.

17. Process for the preparation of an edible water-in-oil emulsion according to claim 1 comprising the steps of:
   a. mixing a fat blend comprising
      between 1 and 6 wt. % of HHH triglycerides and
      between 8 and 50 wt. % of HOH triglycerides;
   b. providing an aqueous phase;
   c. pre-emulsifying said fat blend and said aqueous phase into an oil-in-water emulsion;
   d. inverting the formed pre-emulsion into a water-in-oil emulsion.

18. A method for using a HHH triglyceride fat to promote inversion of an oil-in-water-emulsion comprising 15 to 50 wt% of a fat phase and 50 to 85% of an aqueous phase, into a water-in-oil emulsion, wherein said fat phase comprises 8 to 50% HOH triglycerides, wherein at least 25 wt. % of said HOH triglycerides are StOSt triglycerides, where "St" denotes a stearic acid residue and wherein "H" denotes a saturated fatty acid residue with a C16-O24 carbon chain and "O" denotes an oleic acid residue, and 1 TO 6% HHH triglycerides wherein at least 25% of said HHH triglycerides contain at least two different fatty acid residues comprising mixing a fat blend including the HHH triglycerides and the HOH triglycerides, pre-emulsifying the fat blend and an aqueous phase into an oil-in-water emulsion and inverting the pre-emulsion into a water-in-oil emulsion.

19. The method according to claim 18, wherein said HHH triglycerides comprise at least 30 wt % of triglycerides containing at least two different fatty acid residues per triglyceride molecule.

20. The method according to claim 18, wherein said fat phase comprises Allanblackia fat, Pentadesma fat, Kokum fat, Sal fat or a combination thereof.

* * * * *